United States Patent Office 2,811,553
Patented Oct. 29, 1957

2,811,553

PROCESS FOR THE MANUFACTURE OF UREA

Jonas Kamlet, New York, N. Y., assignor to Commercial Solvents Corporation, Terre Haute, Ind., a corporation of Maryland No Drawing. Application August 26, 1954,
Serial No. 452,442

6 Claims. (Cl. 260—555)

This invention relates to a process for the manufacture of urea. More particularly, it relates to a process for the manufacture of urea from ammonia and carbon dioxide as primary raw materials. It has for its purpose to provide a new process for the manufacture of urea which largely overcomes the technical difficulties now attendant on such processes and which materially simplifies the equipment and installations required.

Processes for the manufacture of urea from ammonia and carbon dioxide are old and well known in the art. Basically, these processes involve the reaction of ammonia and carbon dioxide, in molar proportions of 2 to 4 moles of the former to 1 mole of the latter, at temperatures of 130° C. to 210° C. and pressures of 70 to 300 atmospheres, whereby urea is formed to the extent of 30% to 60% of theoretical. Excess and unreacted ammonia and carbon dioxide are then flashed off from the urea formed, the two gases are separated, each is then condensed and recycled to the process. (Fichter and Becker, Berichte 44, 3473 (1911); Matignon and Frejaques, Comptes rendus Acad. Sci. 170, 462 (1920); 171, 1003 (1921); 174, 455, 1747 (1922); Ann. Chem. (9) 17, 257, 271 (1922); Bull. soc. chem. France (4) 31, 307, 394 (1922), Chemie et Industrie 7, 1057 (1922); Werner, Journ. Chem. Soc. 117, 1046 (1920); Bailey, Comptes rendus Acad. Sci. 175, 279 (1922) and French Patent 554,520 (1922); Norsk Hydro-Elektrisk Norwegian Patent 39,744 (1922); Krase and Gaddy, Ind. Eng. Chem. 14, 611 (1922); Jakowkin, Chem. Zent. 1929I, 2875; Badische Anilin u. Soda Fabrik, German Patent 292,337 (1914), 301,279 (1916), 301,751 (1916), 318,236 (1915), 332,679 (1915), 332,680 (1915), 350,051 (1920), 372,262 (1920), 442,525 (1922); 448,200 (1925); British Patents 145,060 (1920), 182,331 (1921); French Patent 538,804 (1921); U. S. Patents 1,429,483 (1920), 1,453,069 (1921); Krase, U. S. Patent 1,429,953 (1921); Frejaques, French Patent 527,733 (1920); Lamb, U. S. Patent 1,730,208 (1926), British Patent 314,443 (1929); Chemical Trade Journal 81, 101 (1927); Rev. Prod, Chem. 30, 843 (1927); 55, 197 (1952); Casali, German Patent 449,051 (1925), Canadian Patent 259,273 (1925), British Patent 211,123 (1923), French Patent 599,404 (1925) Swiss Patent 118,716 (1925); I. G. Farbenindustrie, U. S. Patent 1,659,190 (1925), British Patent 249,041 (1925), French Patent 605,006 (1925); Mackay, U. S. Patent 2,527,315 (1950); White, U. S. Patent 2,632,771 (1953). Processes have also been developed whereby the reaction is effected in an inert diluent medium, such as a viscous petroleum hydrocarbon or mineral oil or in methanol (Frejaques, U. S. Patent 2,498,538 (1950); Hofsasz, U. S. Patent 1,945,314 (1934); Miller, U. S. Patents 1,908,715 and 1,908,995 (1933)).

The greatest difficulties encountered in the industrial application of the processes may be summarized as follows:

(a) For efficient reagent economy, the unreacted ammonia and carbon dioxide must be recovered, separated and recycled to the process. This involves a complicated and usually expensive differential absorption system. Unless separated, when recompressed to the reaction pressures, the mixture of gases solidifies to ammonium carbamate and clogs up the reactor.

(b) The reaction mixture containing ammonia, carbon dioxide, ammonium carbamate, urea and water is highly corrosive to the materials of construction of the reactor. Lead, silver or special alloys must be used for lining the reaction vessel.

(c) The urea derived as the end-product is usually obtained admixed with water, or as an aqueous solution, in which condition it is difficult (because of its highly hygroscopic nature) to convert it to the desired dense, moisture-free crystalline form.

It is the purpose of this invention to provide a process wherein the excess, unreacted ammonia and carbon dioxide need not be separated, but may be returned to the process without recompression and without danger of clogging the reactor. It is the further purpose of this process to provide a process wherein the corrosion of the reactor lining is largely obviated, whereby a dense, moisture-free crystalline urea is obtained as an end-product and whereby excellent overall yields of urea may be obtained from the ammonia and carbon dioxide overall consumed in the process.

My invention revolves around the novel concept of employing as a reaction medium, diluent and water-entraining agent at least one member of the group consisting of the organic hydrocarbons which form binary, ternary or multicomponent azeotropes with water. These hydrocarbons include the following compounds (with the boiling point of the hydrocarbon-water azeotrope): benzene (69° C.), cyclohexane (69° C.), hexane (62° C.), toluene (84° C.), methylcyclohexane (81° C.), heptane (80° C.), m-xylene (92° C.), ethylbenzene (93° C.), octane (89° C.), mesitylene (96° C.), naphthalene (99° C.), camphene (96° C.), decane (97° C.), as well as mixtures of two or more of such hydrocarbons, as is found in technical light oil from coaltar distillation, gasoline, kerosene, solvent naphtha, Stoddard solvent, petroleum ether, et cetera. Many of these hydrocarbon products may contain hundreds of individual hydrocarbon compounds.

The basis of my invention may best be understood by a stepwise description thereof.

In the first step of the process, ammonia and carbon dioxide, either as compressed liquids or in the gaseous state, separately or in admixture, in the proportions of two moles of ammonia to one mole of carbon dioxide, are absorbed in a body of the hydrocarbon reaction medium above described. The absorption is effected at subatmospheric, atmospheric or superatmospheric pressure at a temperature below the dissociation temperature of ammonium carbamate at the ambient pressure. (The dissociation temperature of ammonium carbamate at various pressures may be given as follows: 7 atm.—60° C.; 6.4 atm.—100° C.; 14.6 atm.—120° C.; 20.8 atm.—130° C.; 28.9 atm.—140° C.; 38.8 atm.—145° C.; 39.4 atm.—150° C.). The reaction of ammonia and carbon dioxide to form ammonium carbamate—$NH_2COONH_4$—is strongly exothermic, so that it is necessary to cool the reaction medium efficiently during the absorption of the ammonia and the carbon dioxide so as to maintain the temperature thereof below the dissociation temperature of ammonium carbamate at the ambient pressure at which the absorption is being effected. This cooling may be effected in any desired manner as, e. g. by the use of circulating brine or ammonia cooling coils or jacket in the reactor, by continuously recirculating a portion of the reaction medium through a cooling zone, et cetera.

The absorption of the $NH_3$ and the $CO_2$ in the hydrocarbon diluent, especially if effected at low temperatures and subatmospheric or atmospheric pressures presents no corrosion problem and may be effected in ordinary cast iron or steel equipment.

The ammonia and carbon dioxide are passed into the hydrocarbon reaction medium until a slurry containing 10% to 50% of ammonium carbamate by weight is obtained. The reaction medium is well agitated during the formation of ammonium carbamate.

Since this is a cyclic process, a portion of the ammonia and carbon dioxide in each cycle of absorption will consist of the unreacted reagents of a preceding cycle. Thus, the mixture of $NH_3$ (2 moles) and $CO_2$ (1 mole) flashed off in the third step from the urea formed, without separation of the components of said mixture, is pumped directly and absorbed in a body of the hydrocarbon diluent, as above described. Fresh ammonia and carbon dioxide, in the proportions of 2 moles $NH_3$: 1 mole $CO_2$ are absorbed as "make-up" in said body of hydrocarbon reaction medium before, after or simultaneously with the absorption of the mixed gas from the preceding cycle. Thus, each charge of ammonium carbamate-hydrocarbon slurry is derived partly from recycled $NH_3$-$CO_2$ gas mixture from a preceding charge and partly from freshly added reagents. A great advantage of my present process is the fact that the absorption of the ammonia and the carbon dioxide in the hydrocarbon diluent may be effected at atmospheric pressure and thus avoid compression of the gaseous reagents and permit the use of simpler and relatively inexpensive equipment.

In the second step of my process, the reaction mixture (consisting of a slurry of ammonium carbamate in hydrocarbon) is heated at temperatures between 130° C. and 210° C. and pressures between 70 and 300 atmospheres, for a reaction period sufficient to effect substantial conversion of the ammonium carbamate to urea, i. e. from 1½ hours to 4 hours. I prefer to employ temperatures between 180° C. and 200° C., and pressures between 150 atm. and 200 atm., with reaction periods of about two hours. However, these conditions of temperature, pressure and reaction times are by no means critical, but each may vary over a wide range. Yields of urea obtained per cycle are between 40% and 50% of the theoretical, based on the ammonia and carbon dioxide employed, under the preferred conditions described.

This reaction may be effected on a batchwise basis, on a semi-continuous basis or as a continuous process, in autoclaves, pressure vessels or tubular reactors of the proper design. The presence of the hydrocarbon diluent largely minimizes the corrosive effect of the ammonium carbamate-urea mixture at the advanced temperatures and pressures employed. Thus, while reaction vessels lined with lead, silver or special alloys may be used to advantage, the autoclaves and pressure reactors for the process of this invention may be lined with Monel metal or nickel alloys. Much less corrosion is noted under the conditions of this process than is encountered in other processes of the prior art.

In the third step of the process, the contents of the pressure reactors or autoclaves of the second step are cooled and discharged into an expansion and condensation vessel at subatmospheric, atmospheric or superatmospheric pressure, at a temperature above the dissociation temperature of ammonium carbamate at the ambient pressure of the vessel (see above) but below the boiling point of the hydrocarbon-water azeotrope (binary, ternary or multicomponent) at the ambient pressure of the vessel. The unreacted ammonia and carbon dioxide gas mixture (in the proportion of 2 volumes of $NH_3$ to 1 volume of $NH_2$) is flashed off and pumped off for absorption, without separation of the components, into a body of the hydrocarbon diluent, as described in the first step. The condensate, consisting of a mixture of hydrocarbon reaction medium, urea and water of reaction, is then passed to a distillation vessel in the fourth step of my process.

This third step of my process may also be effected on a batchwise, semi-continuous or continuous basis. I prefer to effect it on a continuous basis and at or about atmospheric pressure. The contents of the autoclave of the second step are cooled and discharged continuously into the expansion and condensation vessel. Part or all of the cooling of the reaction mixture in the autoclave may be effected by the expansion of the $NH_3$-$CO_2$ gas mixture in the expansion and condensation vessel. The $NH_3$ and $CO_2$ gas mixture (at a temperature between 60° C. and the boiling point of the hydrocarbon-water azeotrope at atmospheric pressure) are continuously flashed off and pumped for absorption into a body of the hydrocarbon reaction medium in the first step of the process. The liquid condensate of hydrocarbon, urea and water is continuously withdrawn from the expansion and condensation vessel and passed to a distillation apparatus.

Especially if effected at subatmospheric or atmospheric pressure, the corrosion problem in this step is minimal, so that the expansion and condensation vessel may be constructed of cast iron or steel.

In the fourth step of the process, the hydrocarbon and the water in the reaction mixture is separated as an azeotrope (binary, ternary or multicomponent) from the urea contained therein, at subatmospheric, atmospheric or superatmospheric pressure, by a simple distillation. The hydrocarbon-water azeotrope is allowed to stratify in the condenser and the hydrocarbon is separated from the water.

If the ratio of water to hydrocarbon in the reaction mixture fed to the still is greater than the ratio of water to hydrocarbon in the azeotrope (i. e. if water remains behind in the urea after the hydrocarbon-water azeotrope has been completely distilled off), the hydrocarbon is continuously returned to the distillation apparatus until no more water distills over and a bone-dry urea is left in still. When all the water has been distilled off and separated from the hydrocarbon, the hydrocarbon is returned to the first step of the process for the absorption of a further quantity of ammonia and carbon dioxide, or is returned to storage for such subsequent use. Here too, especially if effected at subatmospheric or atmospheric pressure, corrosion is no serious problem and the distilling apparatus may be constructed of cast iron or steel.

Thus, in the preferred embodiment of this process, the equipment required may be summarized as follows:

(*a*) Absorption vessels for the reaction of the ammonia and carbon dioxide, equipped with agitator and cooling coils, (*b*) Tubular autoclave reactors, Monel metal lined for the conversion of the ammonium carbamate to urea, (*c*) Expansion and condensation vessels with vents for flashing off the unreacted gaseous reagents and continuously drawing off the hydrocarbon-urea-water condensates, (*d*) Distillation vessels, with water-traps and distillate return heads, with scrapers to remove the dry crystalline urea, (*e*) Pumps for the $NH_3$-$CO_2$ gas mixture, for the fresh $NH_3$ and $CO_2$ feeds and for pumping the hydrocarbon-ammonium carbamate slurry through the autoclaves, (*f*) Storage tanks for the reagents and hydrocarbon, proportioning equipment, temperature and pressure control devices, storage bins for the urea, bagging equipment, et cetera.

Thus, the hydrocarbon used in this process effects the following highly useful purposes:

(a) It serves as a medium for the formation of ammonium carbamate without clogging the reactors, (b) It facilitates the removal of the exothermic heat of formation of the ammonium carbamate, (c) It permits the use of atmospheric pressures in all but the second step, and thus allows for the use of simpler and less expensive equipment, (d) It allows the recycling of the unreacted ammonia and carbon dioxide without the expensive separation and compression of the components of said gas mixture prior to recycling, (e) It permits the use of gaseous ammonia and gaseous carbon dioxide as the fresh feed in the process, rather than compressed or liquefied gases as are now required, (f) It provides a simple method of removing the water of reaction and drying the urea formed while simultaneously recovering the hydrocarbon reaction medium for re-use.

The urea obtained by this process of my invention is a dense, bone-dry crystalline product, pure white in color, analyzing over 46.45% nitrogen (theoretical—46.65% N), with a maximum water content of 0.20%, iron—0.0003%; free ammonia—0.005%; turbidity—none, color (A. P. H. A.)—10 gms. in 100 cc.; methanol—less than 10; ash—0.004%.

The following example is given to define and to illustrate this invention but in no way to limit it to reagents, proportions or conditions described therein. Obvious modifications will occur to any person skilled in the art. All parts given are parts by weight.

Example

In an absorption vessel, equipped with agitator and cooling coils and containing 3000 parts of technical xylene, ammonia gas and carbon dioxide gas are introduced at atmospheric pressure, with good agitation and cooling to keep the temperature below 50° C., in the proportion of 2 volumes of $NH_3$ to 1 volume of $CO_2$, until a total of 436.2 parts of ammonia and 563.8 parts of carbon dioxide have been absorbed.

The slurry of xylene and ammonium carbamate is then pumped through a tubular, Monel metal lined autoclave, at a temperature between 180° C. and 200° C. (pressure 150–200 atm.) for a residence period in the autoclave of two hours. The reaction mixture is then cooled to 90° C. and is discharged into an expansion and condensation vessel at atmospheric pressure, where the unreacted ammonia and carbon dioxide gas mixture flashes off and the residual urea-hydrocarbon-water mixture condenses at a temperature of 70° C. to 80° C., and is run off to the still. The mixture of ammonia and carbon dioxide gas is pumped directly to a body of xylene in the absorption vessel in preparation of the next batch of ammonium carbamate slurry.

The mixture of condensed water, xylene and urea in the still is now distilled azeotropically at atmospheric pressure (90°–100° C.) until no more water distills over, and a dry, crystalline urea is left in the still. The distillate is allowed to stratify and is separated, with the xylene being returned to the first step of the process.

To prepare the next batch of ammonium carbamate-xylene slurry, an additional 199 parts of ammonia and 280 parts of carbon dioxide are now absorbed in the body of xylene containing the ammonium carbamate formed from the unreacted gases flashed off from the preceding batch.

The yield of crystalline urea, melting at 132.5° C., is 338 parts, equivalent to a throughput yield of 44% of the theoretical.

While yields per throughput are 40% to 50% of theoretical, overall yields are excellent—over 97% of theory based on the ammonia and over 95% of theory based on the carbon dioxide. The loss of hydrocarbon reaction medium (e. g. mixed xylenes) averages 22 grams per kilogram of urea formed. Thus, the reagent consumptions per ton of urea are: 1168 lbs. of ammonia, 1544 lbs. of carbon dioxide and 6 gallons of mixed techn. xylene.

Having described my invention, what I claim and desire to protect by Letters Patent is:

1. A cyclic process for the manufacture of urea which comprises the steps of: (a) absorbing ammonia and carbon dioxide in the proportions of two moles of the former to one mole to the latter, in a reaction medium comprising at least one member of the group of hydrocarbons which form azeotropes with water, said absorption being effected at a temperature below the dissociation temperature of ammonium carbamate at the ambient pressure; (b) reacting the resultant mixture of ammonium carbamate at a temperature between 130° C. and 210° C. and at superatmospheric pressures to effect partial conversion of the ammonium carbamate to urea and water; (c) discharging the reaction mixture into a pressure from subatmospheric to superatmospheric at a temperature between the dissociation temperature of ammonium carbamate and the boiling point of the hydrocarbon-water azeotrope at the ambient pressure, and flashing off the unreacted carbon dioxide and ammonia from the condensate of urea, hydrocarbon and water; (d) distilling the hydrocarbon-water azeotrope from the condensate to leave a substantially anhydrous urea; and (e) returning the unseparated mixture of ammonia and carbon dioxide from step (c) to step (a) of the process for reconversion to ammonium carbonate in the hydrocarbon medium.

2. The process of claim 1 where the reaction medium comprises at least one member of the group of hydrocarbons consisting of benzene, cyclohexane, hexane, toluene, methylcyclohexane, heptane, xylene, ethylbenzene, octane, mesitylene, naphthalene, camphene, decane, light oil, gasoline, kerosene, solvent naphtha, Stoddard solvent and petroleum ether.

3. The process of claim 1 where the reaction medium is xylene.

4. The process of claim 1 where steps (a), (c), (d) and (e) are effected at atmospheric pressure.

5. The process of claim 1 where step (b) is effected at a pressure of 150 to 200 atmospheres.

6. The process of claim 1 wherein a slurry of 10% to 50% of ammonium carbamate in a hydrocarbon reaction medium is formed in step (a) and partially converted to urea and water in step (b).

References Cited in the file of this patent

UNITED STATES PATENTS

| | | |
|---|---|---|
| 1,584,875 | Lidholm | May 18, 1926 |
| 1,908,715 | Miller | May 16, 1933 |
| 1,908,995 | Miller | May 16, 1933 |

FOREIGN PATENTS

| | | |
|---|---|---|
| 292,337 | Germany | May 30, 1916 |